United States Patent Office 3,468,817
Patented Sept. 23, 1969

3,468,817
CRYSTALLINE POLYMERS OF PROPYLENE OXIDE
Henry L. Hsieh, Bartlesville, Okla., assignor to Phillips Petroleum Company, a corporation of Delaware
No Drawing. Filed June 7, 1965, Ser. No. 462,102
Int. Cl. C08g 23/14, 23/06
U.S. Cl. 260—2
8 Claims

ABSTRACT OF THE DISCLOSURE 1,2-epoxy propane is polymerized in the presence of a catalyst system formed by mixing an organoaluminum compound and a vanadium-containing compound. The polymer product has increased crystallinity when the polymerization is carried out in the presence of dicyclopentadiene. These polymers can be used as sizes and vehicles in the textile and paint industries, in the preparation of films, and in the fabrication of various shaped articles.

---

This invention relates to propylene oxide polymerization. In one aspect, this invention relates to processes of polymerizing propylene oxide. In another aspect, this invention relates to high crystalline propylene oxide polymers.

A conventional process of polymerizing propylene oxide involves the use of a catalyst system comprising an organoaluminum compound and vanadium acetylacetonate. Although this type of catalyst is reasonably good for effecting polymerization, the resulting polymer has only a fair degree of crystallinity. In the fabrication of certain articles from polymers of propylene oxide, it is desirable to use a high crystalline polymer. In these instances, the propylene oxide polymer produced by the processes of the prior art is unsatisfactory because of its low degree of crystallinity.

According to this invention, this disadvantage of the prior art processes is overcome by providing a process which will result in the production of high crystalline propylene oxide polymers. This result is achieved by employing dicyclopentadiene as an adjuvant during the polymerization. Although it is not known for certain just how the dicyclopentadiene functions to increase the crystallinity of the polymer, it has been discovered that the crystallinity is increased by as much as 100 percent and often by as much as from 200 to 400 percent when the adjuvant of this invention is employed.

Accordingly, it is an object of this invention to increase the crystallinity of propylene oxide polymers.

Another object of this invention is to provide a process of producing high crystalline propylene oxide polymers.

A further object of this invention is to provide an adjuvant which can be used for increasing the crystallinity of propylene oxide polymers.

Still another object of this invention is to provide an improved process of polymerizing propylene oxide.

These and other objects of the invention will become apparent to one skilled in the art after studying the following detailed description and the appended claims.

In the practice of this invention, the crystallinity of the propylene oxide polymer is increased by employing the dicyclopentadiene adjuvant in conjunction with a polymerization catalyst comprising an organoaluminum compound and a vanadium-containing compound. The dicyclopentadiene is present during polymerization of the propylene oxide such that the polymer produced has a high degree of crystallinity.

The organoaluminum compound of the catalyst system can be represented by the formula $$R_nAlX_m$$

wherein R is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3. Organoaluminum compounds within the above formula include organoaluminum monohalides, organoaluminum monohydrides, organoaluminum dihalides, organoaluminum dihydrides, and organoaluminum sesquihalides. The organoaluminum sesquihalides as herein defined are intended to mean a mixture of organoaluminum monohalides and organoaluminum dihalides of the formulas $R_2AlX$ and $RAlX_2$, respectively, wherein R is the same as hereinbefore defined with respect to the general formula and X is a halogen. The organoaluminum sesquihalides can then be written as $R_3Al_2X_3$ or as $R_{1\ 1/2}AlX_{1\ 1/2}$. Exemplary organoaluminum compounds within the above formula include trimethylaluminum, triethylaluminum, tri-n-butylaluminum, triisobutylaluminum, tri-n-hexylaluminum, tri-n-decylaluminum, tri-n-eicosylaluminum, tricyclohexylaluminum, triphenylaluminum, methyldiphenylaluminum, ethyldi(3,5-di-n-heptylphenyl)aluminum, tribenzylaluminum, tri-1-naphthylaluminum, di-n-octylphenylaluminum, tri-4-tolylaluminum, dimethylchloroaluminum, methylchloroaluminum, n-heptyldifluoroaluminum, 3-ethylcyclopentyldiiodoaluminum, methylisobutylchloroaluminum, diphenylbromoaluminum, dibenzylchloroaluminum, di-n-octylchloroaluminum, n-octylphenylchloroaluminum, di-n-eicosyliodoaluminum, n-butyldihydroaluminum, methyldihydroaluminum, diisopropylhydroaluminum, ethylmethylhydroaluminum, diphenylhydroaluminum, benzyl-n-dodecylhydroaluminum, dicyclohexylhydroaluminum, 2,6-di-n-butyl-4-n-hexylphenyldihydroaluminum, and n-amylethylhydroaluminum.

The vanadium-containing compound of the catalyst is selected from the group consisting of vanadium halides, vanadyl halides, vanadium salts of a beta-diketone, and vanadyl salts of a beta-diketone. Vanadium halides and vanadyl halides (vanadium oxyhalides) which can be used include vanadium tribromide, vanadium trichloride, vanadium tertachloride, vanadium trifluoride, vanadium tetrafluoride, vanadium triiodide, vanadium oxydibromide, vanadium oxytribromide, vanadium oxydichloride, vanadium oxytrichloride, vanadium oxydifluoride, vanadium oxytrifluoride, vanadium oxydiiodide, and vanadium oxytriiodide. The vanadium and vanadyl salts of a beta-diketone can be represented by the formula

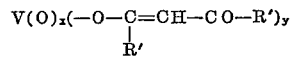

wherein each R' can be the same or different and is a radical selected from the group consisting of saturated aliphatic, saturated cycloaliphatic, and aromatic containing from 1 to 10 carbon atoms, inclusive; $x$ is an integer of from 0 to 1; $y$ is an integer of from 1 to 4, inclusive; and the sum of the integers $2x$ and $y$ equals the valence of the vanadium V. The general formula for metal salts of beta-diketones is expressed structurally in Moeller, "Inorganic Chemistry," page 241, Wiley and Sons, 1952.

Specific beta-diketones which can be combined with the vanadium or vanadyl to form the corresponding vanadium or vanadyl salt include 2,4-pentanedione (acetylacetone); 3,5-heptanedione; 11,13-tricosanedione; 1,3-dicyclohexyl-1,3-propanedione; 1,5-dicyclopentyl-2,4-pentanedione; 1,3-diphenyl-1,3-propanedione; 1,5-diphenyl-2,4-pentanedione; 2,8-dimethyl-4,6-nonanedione; 1,3-di(4-n-butylphenyl)-1,3-propanedione; 1,11-diphenyl-5,7-hendecanedione; 1-phenyl-1,3-butanedione; 2,4-decanedione; and 1-(3,5-dimethylcyclohexyl)-2,4-pentanedione.

The propylene oxide polymerization reaction can be conducted either as a batch process or as a continuous process with the catalyst system being added as a single initial charge or in predetermined increments during polymerization. Similarly, the dicyclopentadiene adjuvant can be added in a single increment at the beginning of the reaction or it can be added in predetermined increments during polymerization. The 1,2-epoxypropane monomer can be introduced into a suitable reaction vessel containing the catalyst and adjuvant as a single charge or the monomers can be added gradually during polymerization. In order to expedite and improve the efficiency of the reaction, it is generally preferred that it be carried out in the presence of an inert diluent. Suitable diluents which can be used for this purpose include paraffinic, cycloparaffinic, and aromatic hydrocarbons containing from about 4 to about 10 carbon atoms per molecule. Exemplary diluents which can be used separately or in admixture with each other are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent forms no part of the invention, it is possible to employ other diluents than those hereinbefore identified without departing from the invention. Mixtures of two or more of the diluents can be used if desired.

The mole ratio of the organoaluminum compound to the vanadium-containing compound in the catalyst system is within the range of from about 2:1 to 100:1 and preferably in the range of from about 5:1 to about 30:1.

Although the amount of catalyst used for effecting the polymerization of the propylene oxide is largely a matter of choice, the catalyst level is preferably and for convenience determined on the basis of the organoaluminum compound present in the catalyst system. As a general rule, the amount of catalyst is maintained within the range of from about 1 to about 100 gram millimoles of organoaluminum per 100 grams of monomer being polymerized and preferably in the range of from about 5 to about 40 gram millimoles of organoaluminum per 100 grams of monomer.

The amount of dicyclopentadiene adjuvant employed is generally in the range of from about 1 to about 50 parts by weight per 100 parts by weight of propylene oxide monomer. Obviously, amounts outside of this range can be used if desired. As a general rule, the adjuvant is present in an amount of from about 3 to about 30 parts by weight per 100 parts by weight of monomer.

The temperature and pressure at which polymerization is effected can vary over a rather wide range. Generally, polymerization is effected at a temperature within the range of from about 40 to about 250° F. and preferably within the range of from about 85 to about 200° F. Polymerization is usually conducted at a pressure which will maintain the materials in a liquid state. It is obvious that the reaction can be conducted at superatmospheric pressures of several thousand pounds if desired.

The duration of the polymerization reaction will depend primarily upon temperature, pressure, and the activity of the particular catalyst being used. Usually, the process will be conducted from a period of from about a few minutes or less to about 100 hours or more.

The dicyclopentadiene adjuvent of this invention, the catalyst level, and the ratio of catalyst components allow the crystallinity and the molecular weight of propylene oxide polymers to be controlled such that the properties of the final product can be varied and controlled. High molecular weight, highly crystalline products are easily obtained. The polymers having a high degree of crystallinity are relatively hard at room temperature, but they achieve a rubbery state when heated slightly above room temperature. Moreover, the propylene oxide polymers prepared using the adjuvant of this invention possess a high green tensile strength. The polymers are extremely resistant to the effects of heat and ozone.

The polymers produced by the novel process of this invention have a variety of different uses depending upon the particular properties of the polymer. They can be used as sizes and vehicles in the textile and paint industries. The propylene oxide polymers can also be used in the preparation of films by conventional techniques such as milling, calendering, solvent casting, and the like. The polymers can also be used in the fabrication of various shaped articles such as those used in the automobile industry.

The following examples will serve to illustrate the improved results obtained by polymerizing propylene oxide in the presence of the dicyclopentadiene adjuvant of this invention. The catalyst system used comprises triisobutylaluminum and the vanadium salt of 2,4-pentanedione (vanadium acetylacetonate). It is obvious that the invention is not limited by the conditions and materials set forth in the examples. Thus, the vanadium-containing component in the catalyst can be any vanadium salt or vanadyl salt of a beta-diketone, or any vanadium or vanadyl halide. Similarly, the organoaluminum component in the catalyst can be any compound within the purview of the general formula herinbefore defined.

Examples 1–6

A series of runs was conducted whereby 1,2-epoxypropane was polymerized in the presence of dicyclopentadiene. Comparative or control runs were made under identical conditions without dicyclopentadiene in an effort to illustrate the improvements obtained by using the adjuvant of this invention. The runs were divided into two series wherein toluene was used as a diluent in one series and cyclohexane was used as a diluent in the other series. The materials were charged to a reactor in the following proportions:

| | |
|---|---|
| 1,2-epoxypropane, parts by weight | 100 |
| Dicyclopentadiene (DPCD), p.h.m.[1] | Variable |
| Toluene or cyclohexane, parts by weight | Variable |
| Triisobutylaluminum (TBA), m.h.m.[2] | 30 |
| Vanadium acetylacetonate [V(AA)$_3$], m.h.m.[2] | Variable |
| Temperature, ° F. | 158 |
| Time, hours | 48 |

[1] Phm.=parts by weight per 100 parts by weight epoxypropane.
[2] Mhm.=gram millimoles per 100 grams epoxypropane.

The polymerization technique used involved the steps of charging the diluent to the reactor and thereafter purging it with nitrogen. The 1,2-epoxypropane was then charged to the reactor followed by the organoaluminum compound and the vanadium-containing compound. In the runs which illustrate the improvement obtained by the invention, the dicyclopentadiene was added immediately following the addition of the 1,2-epoxypropane. At the termination of each run, the viscosity of the reaction mixture was reduced by adding acetone, isopropyl alcohol, or a mixture of these materials. Approximately 1 weight percent, based on the polymer, of 2,2'-methylene-bis(4-methyl-6-tertbutylphenol) antioxidant was added. The mixture was poured into water with high speed stirring and subsequently separated into an aqueous phase and an organic phase. The organic phase was removed and the polymer was recovered from it by evaporating the diluent. The polymer product was then dried under vacuum. The polymers thus produced were observed to be gel-free. The results from the control runs and the several runs illustrating the improvements obtained by this invention are reported in Table I below. The crystallinity of each of the polymers was determined by dissolving 2 grams of the polymer in 200 ml. of acetone at 50° C. The mixture was then cooled to about −30° C., filtered, and the residue or undissolved portions of the polymer dried in an oven under vacuum. The solid or insoluble portion represents the crystalline part of the polymer.

In order to determine the inherent viscosity, one-tenth gram of polymer was placed in a wire cage made from 80-mesh screen and the cage was placed in 100 ml. of toluene contained in a wide-mouth, 4-ounce bottle. After standing at room temperature (approximately 77° F.) for about 24 hours, the cage was removed and the solution filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

TABLE II

| Example No. | DCPD, p.h.m. | Conv., (percent) | Inh. visc. | Crystalline polymer (Wt. percent) |
|---|---|---|---|---|
| 7 | 5 | 72 | 1.09 | 33 |
| 8 | 10 | 71 | 1.78 | 39 |
| 9 | 20 | 80 | 1.36 | 50 |
| 10 | 30 | 71 | 1.88 | 52 |

The data obtained by means of Examples 7 through 10 show a relationship between the crystallinity and the quantity of adjuvant employed. On the basis of this data it can be seen that as the quantity of dicyclopentadiene is increased the crystallinity of the polymer increases. These examples further illustrate the operability of this invention within all feasible ranges of adjuvant concentration.

Although the highest degree of crystallinity is obtained when the polymerization is effected in the presence of a non-aromatic diluent such as a paraffinic or a cycloparaffinic hydrocarbon, it is obvious that aromatics can be used as diluents if desired.

TABLE I

| Example No. | Diluent Type | p.h.m. | V(AA)₃, (m.h.m.) | DCPD, (p.h.m.) | Conv., Percent | Inh. visc. | Crystalline polymer (wt. percent) | Increase in crystallinity (percent) |
|---|---|---|---|---|---|---|---|---|
| Control | Toluene | 860 | 2 | 0 | 67 | 3.68 | 11 | |
| 1 | do | 860 | 2 | 20 | 75 | 4.36 | 22 | 100 |
| Control | do | 860 | 4 | 0 | 62 | 4.93 | 20 | |
| 2 | do | 860 | 4 | 20 | 72 | 5.27 | 28 | 40 |
| Control | do | 860 | 6 | 0 | 50 | 4.40 | 23 | |
| 3 | do | 860 | 6 | 20 | 65 | 6.07 | 29 | 26 |
| Control | Cyclohexane | 780 | 2 | 0 | 90 | 2.63 | 14 | |
| 4 | do | 780 | 2 | 20 | 86 | 4.18 | 70 | 400 |
| Control | do | 780 | 4 | 0 | 87 | 2.49 | 14 | |
| 5 | do | 780 | 4 | 20 | 86 | 4.29 | 55 | 293 |
| Control | do | 780 | 6 | 0 | 80 | 3.22 | 23 | |
| 6 | do | 780 | 6 | 20 | 83 | 4.20 | 46 | 100 |

It is apparent from the data that a significant increase in crystallinity is obtained when dicyclopentadiene is used during polymerization in accordance with this invention. The crystallinity of the polymer increased from 26 to as much as 400 percent with an average increase of about 127 prcent. Another improvement obtained by using the adjuvant of this invention is that the green tensile strength of the polymers is increased. Green tensile strength represents the tensile strength of the uncured polymer. The green tensile strength from the polymers produced in the control runs ranged from about 200 to about 400 p.s.i. The polymer produced in Example No. 4 using dicyclopentadiene had a green tensile strength of about 1700 p.s.i.

Examples 7–10

A series of runs was conducted whereby propylene oxide was polymerized in the presence of varying quantities of dicyclopentadiene as the adjuvant. The catalyst system comprised a mixture of triisobutylaluminum and vanadium acetylacetonate. The materials were charged to a reactor in the following proportions:

| | |
|---|---|
| 1,2-epoxypropane, parts by weight | 100 |
| Dicyclopentadiene, p.h.m.¹ | Variable |
| Cyclohexane, parts by weight | 780 |
| Triisobutylaluminum, m.h.m.² | 30 |
| Vanadium acetylacetonate, m.h.m.² | 2 |
| Temperature, ° F. | 158 |
| Time, hours | 48 |

¹ Phm.=parts by weight per 100 parts by weight epoxypropane.
² Mhm.=gram millimoles per 100 grams epoxypropane.

The technique employed for polymerizing the propylene oxide was the same as that used in connection with Examples 1 through 6. The crystallinity of each of the polymers produced was determined in the same manner as the crystallinity was determined for the polymers produced by Examples 1 through 6. The results obtained by these examples are presented in Table II below.

Although the invention has been described in considerable details, it must be understood that such detail is for the purpose of illustration only and that many variations and modifications can be made by one skilled in the art without departing from the spirit and scope of the invention.

I claim:
1. In a process of polymerizing 1,2-epoxypropane in the presence of a catalyst system comprising an organoaluminium compound and a vanadium-containing compound wherein the mole ratio of said organoaluminum compound to said vanadium-containing compound is in the range of from about 2:1 to 100:1, the improvement comprising conducting said polymerization in the presence of dicyclopentadiene.

2. A process according to claim 1 wherein the dicyclopentadiene is present in an amount of from about 1 to about 50 parts by weight per 100 parts by weight 1,2-epoxy propane monomer.

3. In a process of polymerizing 1,2-epoxypropane in the presence of a catalyst system comprising (a) an organoaluminum compound of the formula $$R_nAlX_m$$

wherein R is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer from 0 to 2, inclusive; and the sum of the integers $n$ and $m$ equals 3; and (b) a vanadium-containing compound selected from the group consisting of vanadium halides, vanadyl halides, vanadium salts of a beta-diketone; and vanadyl salts of a beta-diketone; wherein the mole ratio of said organoaluminum compound to said vanadium-containing compound is in the range of from about 2:1 to 100:1; the improvement comprising conducting said polymerization in the presence of dicyclopentadiene.

4. A process according to claim 3 wherein the dicyclopentadiene is present in an amount of from about 1 to about 50 parts by weight per 100 parts by weight 1,2-epoxy propane monomer.

5. In a process of polymerizing 1,2-epoxypropane in the presence of a catalyst system comprising (a) an organoaluminum compound of the formula

wherein R is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3 inclusive; $m$ is an integer of from 0 to 2 inclusive; and the sum of the integers $n$ and $m$ equals 3; and (b) a vanadium-containing compound selected from the group consisting of vanadium halides, vanadyl halides, and vanadium salts of the formula

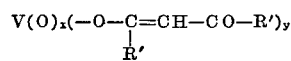

wherein each R' can be the same or different and is a radical selected from the group consisting of saturated aliphatic, saturated cycloaliphatic, and aromatic containing from 1 to 10 carbon atoms, inclusive; $x$ is an integer of from 0 to 1; $y$ is an integer from 1 to 4, inclusive; and the sum of the integers $2x$ and $y$ equals the valence of the vanadium V; wherein the mole ratio of said organoaluminum compound to said vanadium-containing compound is in the range of from about 2:1 to 100:1; the improvement comprising conducting said polymerization in the presence of from about 1 to about 50 parts by weight dicyclopentadiene per 100 parts by weight 1,2-epoxypropane monomer.

6. A process according to claim 5 wherein said polymerization is carried out at a temperature within the range of about 40 to about 250° F.

7. A catalyst system comprising:

(a) an organoaluminum compound of the formula

wherein R is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer from 0 to 2, inclusive; and the sum of the integers $n$ and $m$ equals 3;

(b) a vanadium-containing compound selected from the group consisting of vanadium halides, vanadyl halides, and vanadium salts of the formula

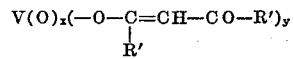

wherein each R' can be the same or different and is a radical selected from the group consisting of saturated aliphatic, saturated cycloaliphatic, and aromatic containing from 1 to 10 carbon atoms, inclusive; $x$ is an integer of from 0 to 1; $y$ is an integer of from 1 to 4, inclusive; and the sum of the integers $2x$ and $y$ equals the valence of the vanadium V; the mole ratio of said organoaluminum compound to said vanadium-containing compound being in the range of about 2:1 to about 100:1; and (c) dicyclopentadiene.

8. A catalyst system according to claim 7 wherein the dicyclopentadiene is present in an amount within the range of about 1 to about 50 parts by weight per 100 parts by weight 1,2-epoxy propane monomer.

References Cited

J. of Polymer Science, vol. 51, issue 156 (1961), (pp. S7–S10 relied on).

HARRY WONG, JR., Primary Examiner

U.S. Cl. X.R.

252—429, 431, 32.8